(12) United States Patent
Greenwood et al.

(10) Patent No.: US 8,833,790 B2
(45) Date of Patent: Sep. 16, 2014

(54) MILITARY VEHICLE TOWING ASSEMBLY

(75) Inventors: Kyle L. Greenwood, Bryan, TX (US);
Matthew Howell, Bryan, TX (US);
Devin Gerland, Bryan, TX (US)

(73) Assignee: Black Mountain Industries, Inc., Bryan, TX (US)

( * ) Notice: Subject to any disclaimer, the term of this patent is extended or adjusted under 35 U.S.C. 154(b) by 0 days.

(21) Appl. No.: 13/534,458

(22) Filed: Jun. 27, 2012

(65) Prior Publication Data

US 2014/0001732 A1    Jan. 2, 2014

(51) Int. Cl.
*B60D 1/30* (2006.01)
*B60D 1/167* (2006.01)

(52) U.S. Cl.
CPC .................................... *B60D 1/1675* (2013.01)
USPC .................. 280/456.1; 280/455.1; 280/460.1; 280/479.2; 280/482

(58) Field of Classification Search
USPC .............. 280/456.1, 455.1, 460.1, 479.2, 482
See application file for complete search history.

(56) References Cited

U.S. PATENT DOCUMENTS

| | | | |
|---|---|---|---|
| 5,957,477 A * | 9/1999 | Ensz et al. | 280/482 |
| 7,959,179 B1 * | 6/2011 | Merchant | 280/493 |
| 8,128,116 B1 * | 3/2012 | Huston et al. | 280/493 |
| 8,353,522 B2 * | 1/2013 | Helland et al. | 280/491.4 |
| 2007/0001425 A1 * | 1/2007 | Helms et al. | 280/456.1 |

* cited by examiner

*Primary Examiner* — Joseph M Rocca
*Assistant Examiner* — Marlon Arce
(74) *Attorney, Agent, or Firm* — Tumey L.L.P.

(57) ABSTRACT

An assembly and method allow military vehicles to be towed. In an embodiment, a towing assembly for towing a vehicle with a towing vehicle includes a lunette. The lunette attaches the towing assembly to the towing vehicle. The towing assembly also includes tow bars. The tow bars are attached to the lunette. At least one of the tow bars is laterally moveable. The towing assembly also includes tow legs. Each tow leg is slidably engaged with an interior of a tow bar. The tow leg is attachable to the vehicle.

7 Claims, 9 Drawing Sheets

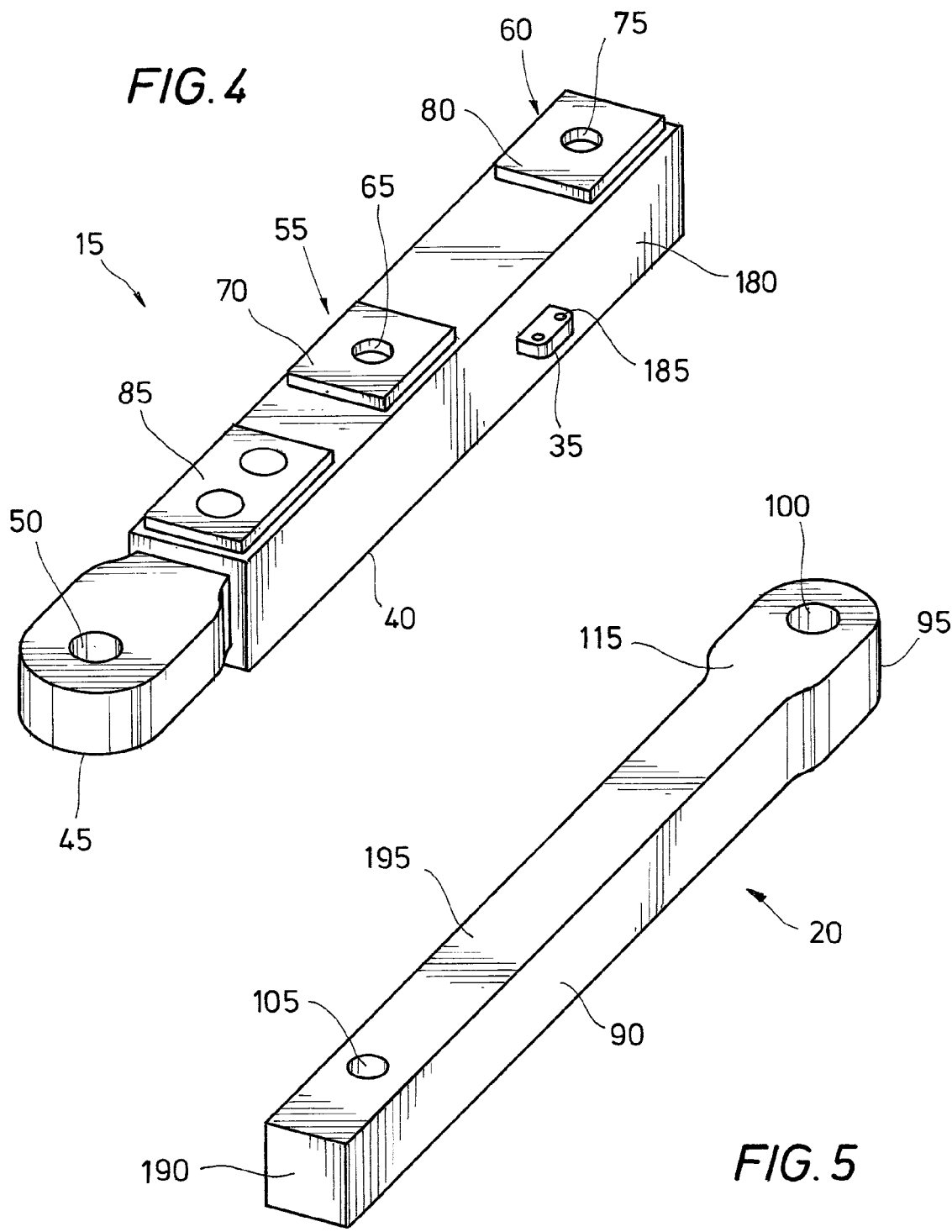

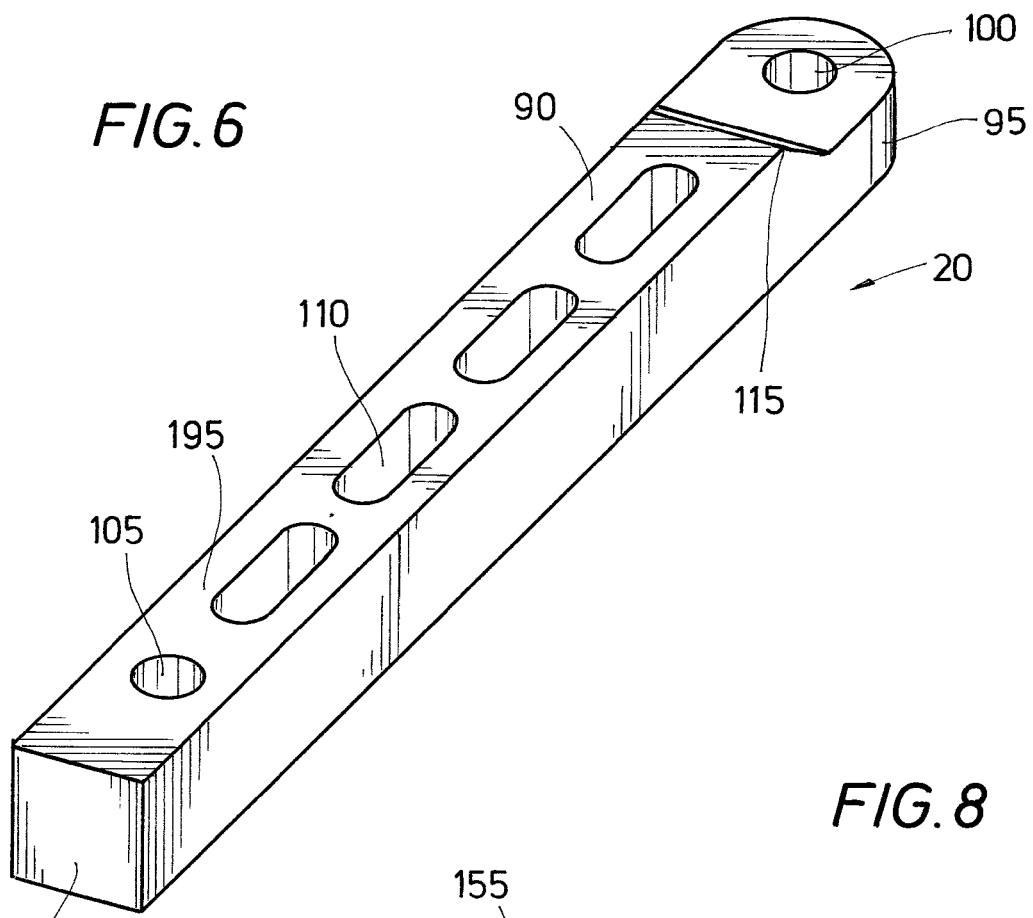
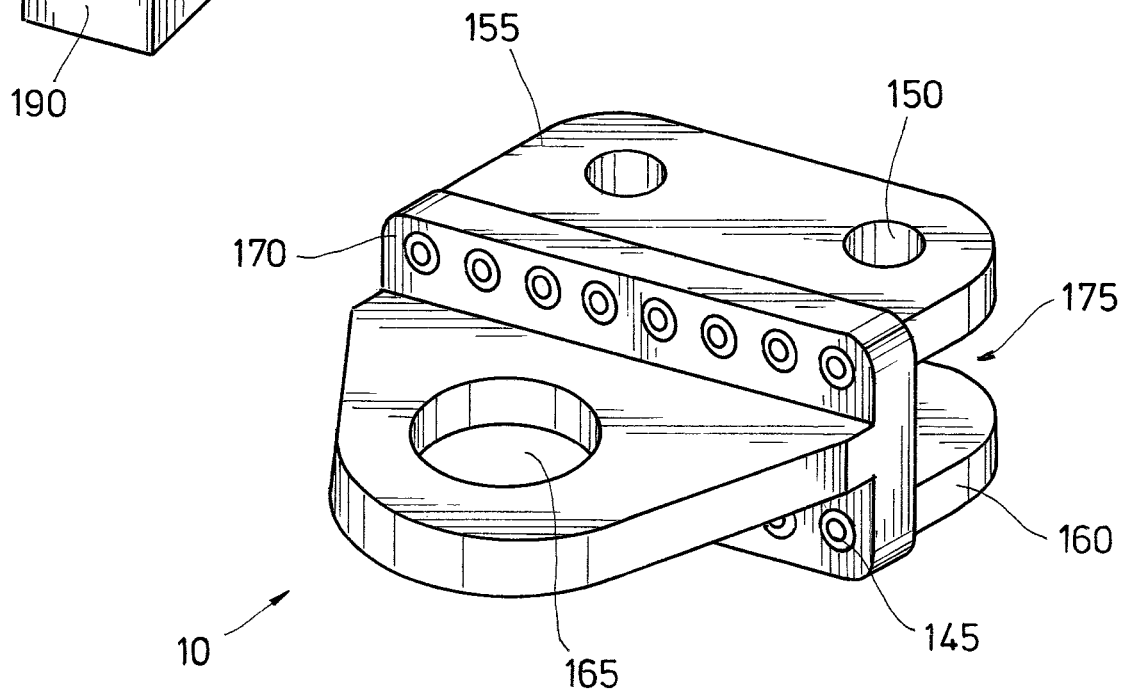

MILITARY VEHICLE TOWING ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to the field of towing and more specifically to the field of towing military vehicles with a towing assembly.

2. Background of the Invention

There is a widespread need for improved methods and devices for towing vehicles (i.e., military vehicles) or equipment (i.e., military equipment). Towing hitches have been typically used for such applications. However, there are a number of drawbacks to the conventional towing hitches. For instance, there are typically different towing hitches for different types and sizes of vehicles. Difficulties may arise if a hitch is not designed for the size of vehicle desired to be towed. In addition, efficiency is typically very important in a military environment.

Consequently, there is a need for improved methods and devices for towing vehicles and equipment.

BRIEF SUMMARY OF SOME OF THE PREFERRED EMBODIMENTS

These and other needs in the art are addressed in one embodiment by a towing assembly for towing a vehicle with a towing vehicle. The towing assembly includes a lunette. The lunette attaches the towing assembly to the towing vehicle. The towing assembly also includes tow bars. The tow bars are attached to the lunette. At least one of the tow bars is laterally moveable. The towing assembly also includes tow legs. Each tow leg is slidably engaged with an interior of a tow bar. The tow leg is attachable to the vehicle.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 4 illustrates a perspective top view of an embodiment of a tow bar;

FIG. 5 illustrates a perspective top view of an embodiment of a tow leg;

FIG. 6 illustrates a perspective top view of an embodiment of a tow leg with tow leg notches;

FIG. 8 illustrates a perspective side view of an embodiment of a lunette;

DETAILED DESCRIPTION OF THE PREFERRED EMBODIMENTS

Figure 1:
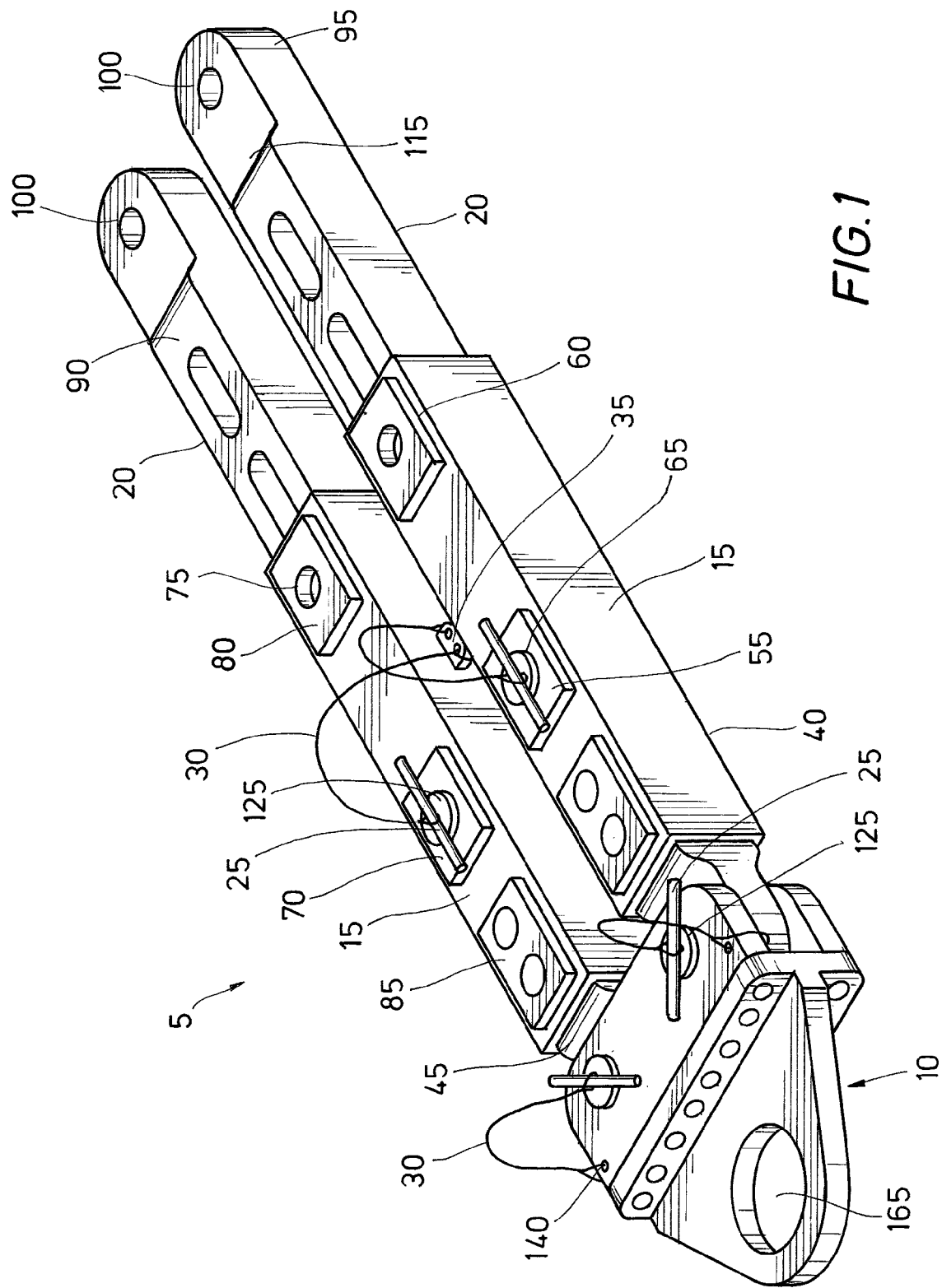
FIG. 1 illustrates a perspective top view of an embodiment of a towing assembly in a stowage position.

FIG. 1 illustrates an embodiment of a towing assembly 5 having a lunette 10, a tow bar 15, and a tow leg 20. In embodiments as shown, towing assembly 5 has two tow bars 15 and two tow legs 20. Each tow leg 20 is slidably engaged with a tow bar 15. In an embodiment, a tow leg 20 is longitudinally slidable within the interior (not illustrated) of tow bar 15. For instance, a tow leg 20 may be slid into tow bar 15 in the direction of lunette 10, and the tow leg 20 may be slid in the longitudinal direction away from lunette 10. Tow bars 15 are attachable to lunette 10.

Figure 2:
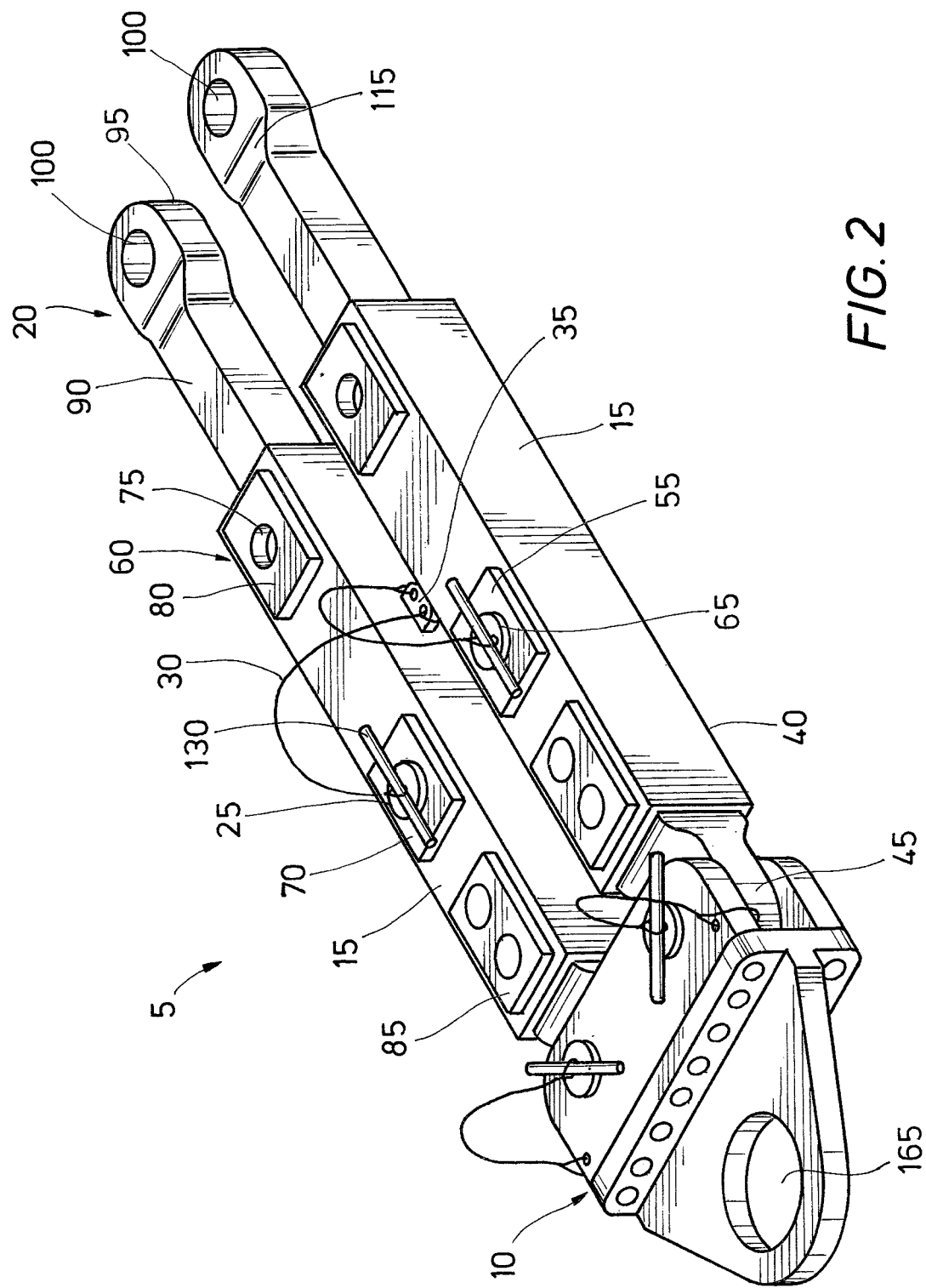
FIG. 2 illustrates a perspective top view of another embodiment of a towing assembly in a stowage position.

An embodiment of tow bar 15 is shown in FIGS. 1, 2, 3, and 4. As shown, tow bar 15 includes tow bar body 40 and lunette attachment body 45. Tow bar body 40 may have any configuration suitable for allowing tow leg 20 to be slidably engaged with the interior of tow bar 15. In an embodiment, tow bar 15 has stowage position 55 and towing position 60. In an embodiment, stowage position 55 indicates a position of tow bar 15 in which tow leg 20 is locked to allow tow leg 20 to be stowed. In such an embodiment, tow leg 20 is disposed in the interior of tow bar 15 to a position at which the further longitudinal movement of tow leg 20 in or out of tow bar 15 is prevented. FIGS. 1 and 2 illustrate embodiments in which tow legs 20 are locked in stowage position 55. In an embodiment, stowage position 55 includes stowage position opening 65 and stowage position pin stop 70. Stowage position opening 65 has a sufficient diameter to allow a locking mechanism to be inserted through stowage position opening 65 and into tow leg 20 to lock tow leg 20 at stowage position 55. In embodiments, towing assembly 5 includes bar pin 25 as the locking mechanism. Stowage position pin stop 70 has any configuration suitable for contact with bar pin 25. For instance, bar pin stop 125 contacts stowage position pin stop 70. In an embodiment, stowage position pin stop 70 prevents bar pin 25 from moving an undesired distance into the interior of tow bar 15. Without limitation, in some embodiments as shown, contact of bar pin stop 125 with stowage position pin stop 70 allows a sufficient spacing between bar pin handle 130 and stowage position pin stop 70 to facilitate removal of bar pin 25 from the interior of tow bar 15 by a user applying a pulling force to bar pin handle 130.

Figure 3:
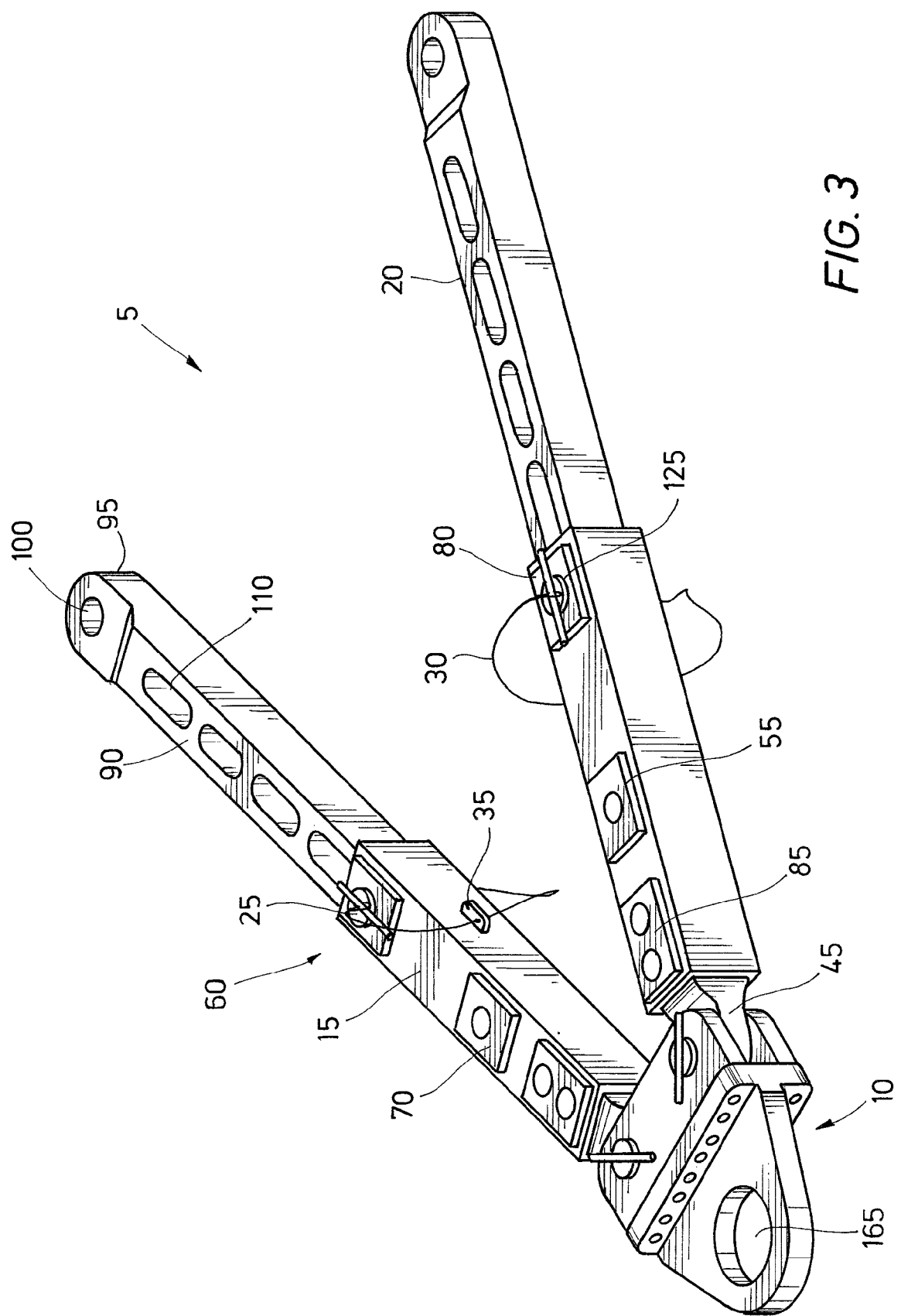
FIG. 3 illustrates a perspective top view of an embodiment of a towing assembly in a towing position.

In embodiments as further shown in FIGS. 1, 2, 3, and 4, towing position 60 indicates a position of tow bar 15 in which tow leg 20 is locked to allow tow leg 20 to be attached to a vehicle to be towed. FIG. 3 illustrates an embodiment in which tow leg 20 is locked in towing position 60. In embodiments, tow leg 20 is disposed in the interior of tow bar 15 at a position at which the further longitudinal movement of tow leg 20 in or out of tow bar 15 is prevented. In an embodiment, towing position 60 includes towing position opening 75 and towing position pin stop 80. Towing position opening 75 has a sufficient diameter to allow a locking mechanism to be inserted through towing position opening 75 and into tow leg 20 to lock tow leg 20 at towing position 60. In embodiments in which towing assembly 5 includes bar pin 25 as the locking mechanism, towing position pin stop 80 has any configuration suitable for contact with bar pin 25. For instance, bar pin stop 125 contacts towing position pin stop 80. In an embodiment, towing position pin stop 80 prevents bar pin 25 from moving an undesired distance into the interior of tow bar 15. Without limitation, in some embodiments as shown, contact of bar pin stop 125 with towing position pin stop 80 allows a spacing between bar pin handle 130 and towing position pin stop 80 sufficient to facilitate removal of bar pin 25 from the interior of tow bar 15 by a user applying a pulling force to bar pin handle 130.

In an embodiment as shown in FIGS. 1-4, towing assembly 5 includes bar pin attachment 35. Bar pin attachment 35 is attached to tow bar 15. In an embodiment, bar pin attachment 35 is attached to a side of tow bar 15. In embodiments as shown, bar pin attachment 35 is attached to tow bar 15 on the interior side 180 of tow bar 15. Bar pin attachment 35 has a configuration suitable for attachment of bar pin attachment cord 30. In embodiments, bar pin attachment 35 has a configuration suitable for attachment of two bar pin attachment cords 30. In an embodiment as shown, bar pin attachment 35 has bar pin attachment orifices 185 through which bar pin attachment cords 30 pass.

In some embodiments as shown in FIGS. 1-4, tow bar 15 includes lunette attachment body 45 and lunette attachment body securing means 85. Lunette attachment body securing means 85 includes any means suitable for securing lunette attachment body 45 to tow bar body 40. Without limitation, examples of suitable lunette attachment body securing means 85 include screws, welds, and the like. Lunette attachment body 45 includes any suitable configuration for attaching tow bar 15 to lunette 10. In embodiments, lunette attachment body 45 has a height suitable for disposition between hitch upper platform 155 and hitch lower platform 160 in lunette gap 175 (as shown in FIG. 8). In an embodiment as shown, lunette attachment body 45 has a lunette pin opening 50. Lunette pin opening 50 has a diameter suitable for a bar pin 25 to pass therethrough.

In an embodiment as shown in FIGS. 1, 3, and 6, tow legs 20 have tow leg body 90 and tow leg attachment end 95. Tow leg body 90 has a configuration suitable for disposition within tow bar 15. As shown, tow leg body 90 has tow leg attachment opening 105. In an embodiment, tow leg attachment opening 105 has a sufficient diameter to allow a bar pin 25 to pass therethrough, which allows bar pins 25 to secure the tow legs 20 at stowage positions 55 or towing positions 60. In embodiments as shown, tow leg body 90 has tow leg notches 110. A tow leg notch 110 is a removed section of tow leg body 90. In an embodiment, the tow leg notches 110 extend laterally completely through tow leg body 90. Without limitation, a tow leg notch 110 decreases the weight of tow leg 20. Tow leg 20 may have any desirable number of tow leg notches 110. In embodiments as shown, tow leg notches 110 are disposed between tow leg attachment end 95 and tow leg attachment opening 105. In some embodiments as illustrated in FIGS. 2 and 5, tow leg 20 does not have tow leg notches 110. In embodiments, tow leg 20 has tow leg attachment end 95 on an opposing end of tow leg 20 from tow leg end 190. Tow leg end 190 is the end of tow leg 20 that is initially inserted into tow bar 15. Tow leg attachment end 95 has tow leg hitch opening 100. Tow leg hitch opening 100 allows tow leg 20 to be attached to the vehicle that is desired to be towed. For instance, a hitch or other attachment means passes through tow leg hitch opening 100 to attach towing assembly 5 to the military vehicle desired to be towed. In some embodiments as shown, tow leg attachment end 95 has tow leg attachment stop 115. In embodiments, tow leg attachment stop 115 prevents unwanted movement of a portion of the military vehicle to be towed (i.e., the hitch of such vehicle) from moving passed tow leg attachment end 95 and along tow leg 20, which may prevent unwanted possible damage to towing assembly 5 before tow leg attachment end 95 is attached to such vehicle. In an embodiment as shown, tow leg attachment stop 115 is a portion of tow leg attachment end 95 that provides an incline from tow leg attachment end 95 to top surface 195 of tow leg body 90.

As further shown in embodiments of FIGS. 1-3 and 8, towing assembly 5 also includes lunette 10. Lunette 10 attaches towing assembly 5 to the towing military vehicle. In embodiments as shown, lunette 10 includes lunette opening 165. Lunette opening 165 has a diameter suitable for allowing attachment to the towing military vehicle. Lunette 10 has hitch upper platform 155, hitch lower platform 160, and lunette stop 170. In embodiments as shown, hitch upper platform 155 and hitch lower platforms 160 are disposed about parallel to each other with lunette gap 175 disposed therebetween. In embodiments, hitch upper platform 155 and hitch lower platform 160 are secured to lunette stop 170 by securing means 145. Securing means 145 may include any suitable means for securing hitch upper platform 155 and hitch lower platform 160 to lunette stop 170. For instance, without limitation, in an embodiment, securing means 145 are screws. Lunette 10 also includes bar pins 25 and hitch openings 150. In an embodiment as shown, lunette 10 has a bar pin 25 and a hitch opening 150 for each tow bar 15. The bar pins 25 of lunette 10 are attached to lunette 10 by any suitable means. In an embodiment, bar pin 25 has bar pin attachment cord 30, which is attached to lunette 10 by cord attachment means 140. In an embodiment as shown, cord attachment means 140 are holes in lunette 10 though which bar pin attachment cord 30 passes. In embodiments as shown, lunette stop 170 is disposed about perpendicular to hitch upper platform 155 and hitch lower platform 160. Without limitation, lunette stop 170 provides a stop for unwanted movement of a portion of the towing military vehicle (i.e., the trailer hitch of the towing vehicle) toward tow bars 15 (i.e., the unwanted movement is stopped when the hitch contacts lunette stop 170 before bar pins 25 are inserted into hitch openings 150). For instance, the trailer hitch contacts the lunette stop 170. Further, without limitation, the lunette stop 170 also prevents unwanted movement of tow bars 15 in the direction of the towing military vehicle (e.g., before bar pins 25 are inserted in tow bars 15). For instance, lunette attachment body 45 contacts lunette stop 170 before contacting the military vehicle.

Figure 7:
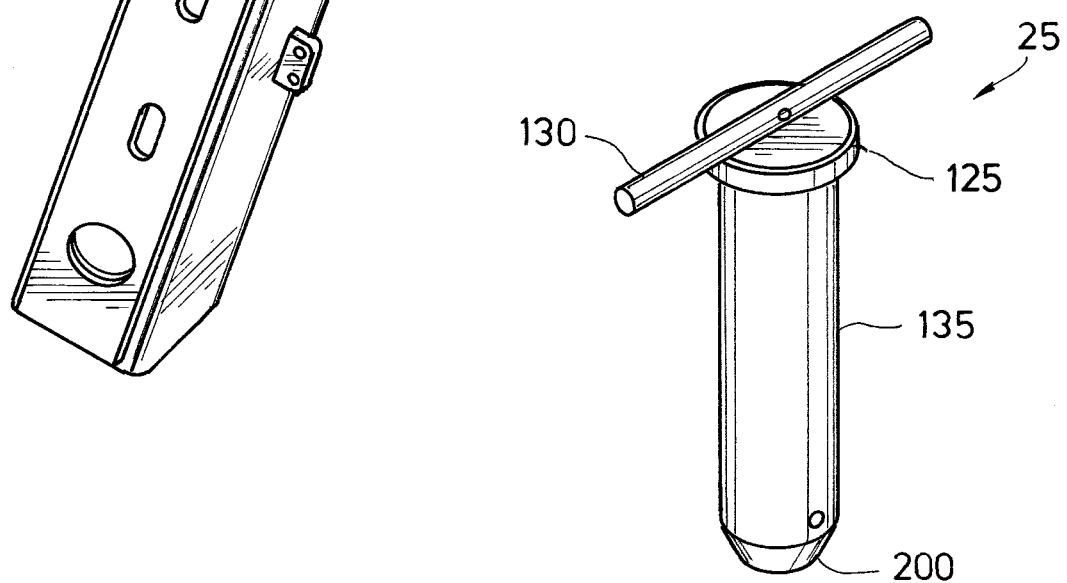
FIG. 7 illustrates a perspective side view of an embodiment of a bar pin.

FIG. 7 illustrates an embodiment of bar pin 25. As shown, bar pin 25 includes bar pin stop 125, bar pin handle 130, and bar pin body 135. In an embodiment as shown, bar pin stop 125 is disposed about perpendicular to a longitudinal plane running lengthwise through bar pin body 135. As shown, bar pin stop 125 is disposed on the opposing end of bar pin body 135 from the end 200 of bar pin 25 that is inserted through a desired opening of towing assembly 5. Such desired openings include hitch openings 150, stowage position openings 65, and towing position openings 75. Bar pin handle 130 has any configuration suitable for allowing pressure to be applied to bar pin 25 to push bar pin body 135 into a desired opening or pull bar pin body 135 out of a desired opening.

In embodiments of operation as shown in FIGS. 1 and 2, towing assembly 5 is attached to a vehicle (i.e., military vehicle) by attachment of lunette 10 to the vehicle. For instance, the trailer hitch of the military vehicle is attached to lunette 10 by lunette opening 165. Tow bars 15 may be attached to lunette 10 by bar pins 25 passing through lunette pin openings 50 and hitch openings 150. In an embodiment, each tow bar 15 is laterally pivotable about a bar pin 25. Such laterally pivotable movement allows tow bars 15 to move laterally and therefore allows towing assembly 5 to be able to attach to vehicles of different sizes for towing. For a stowage position 55 of towing assembly 5, tow legs 20 are inserted into tow bars 15 to a sufficient position to allow bar pins 25 of tow bars 15 to be inserted through stowage position openings 65 and tow leg attachment openings 105. In such an embodiment, tow legs 20 are secured in the stowage position 55. In embodiments in which it is desired to attach towing assembly 5 to a vehicle to be towed by the towing military vehicle attached to lunette 10, bar pins 25 of tow bars 15 are removed from stowage position openings 65, and tow legs 20 are moved outward through the respective tow bars 15 until tow leg attachment openings 105 are in a sufficient position to allow bar pins 25 to be inserted through towing position openings 75 and tow leg attachment openings 105. In such embodiments, tow legs 20 are secured in the towing positions 60. When secured in the towing positions 60, tow legs 20 may be attached to the vehicle desired to be towed.

Figure 10:
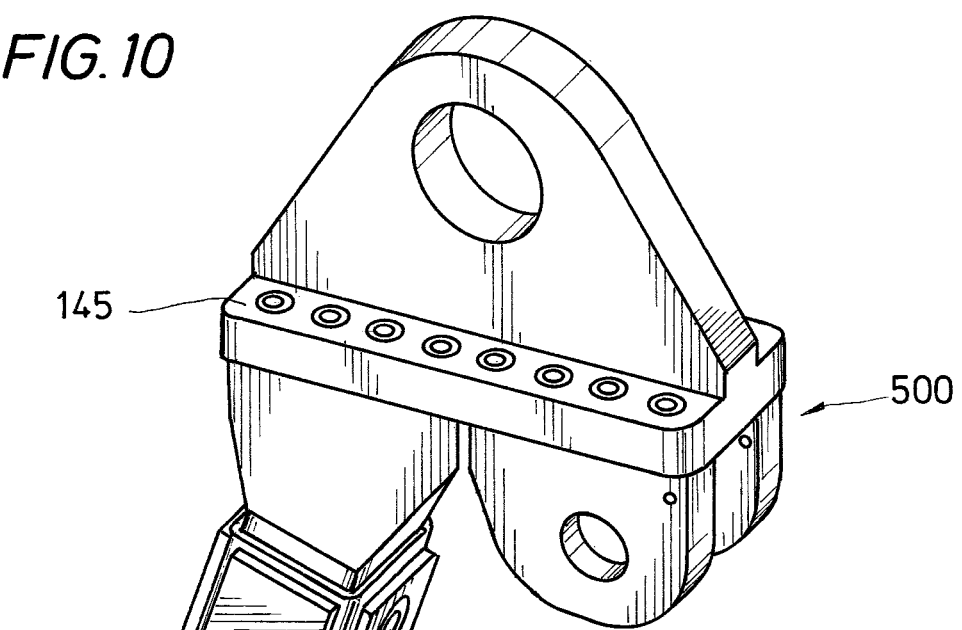
FIG. 10 illustrates a top perspective view of an embodiment of a towing assembly with a tow bar having an attachment surface.
Figure 9:
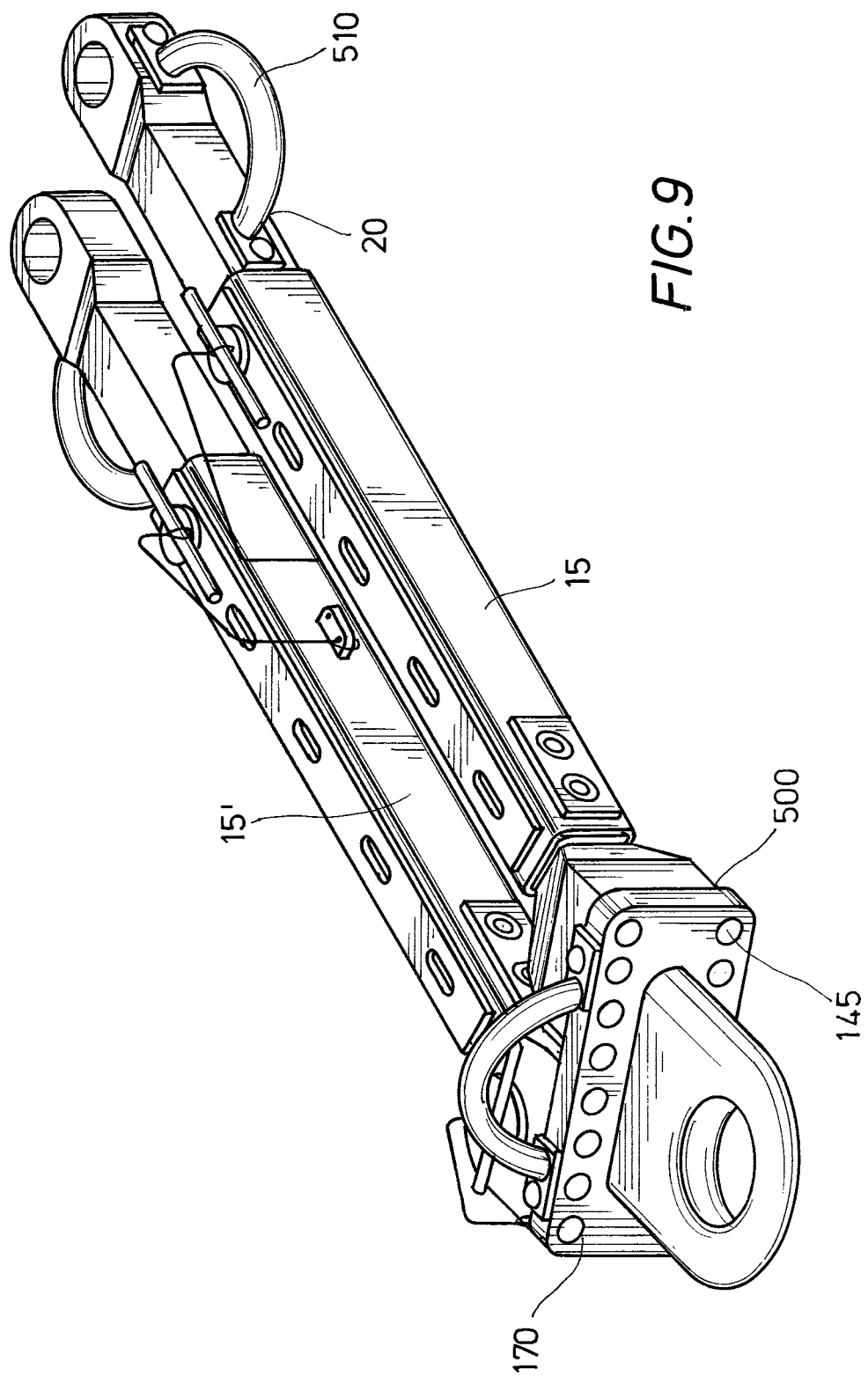
FIG. 9 illustrates a perspective top view of an embodiment of a towing assembly with a tow bar having an attachment surface and handles.
Figure 11:
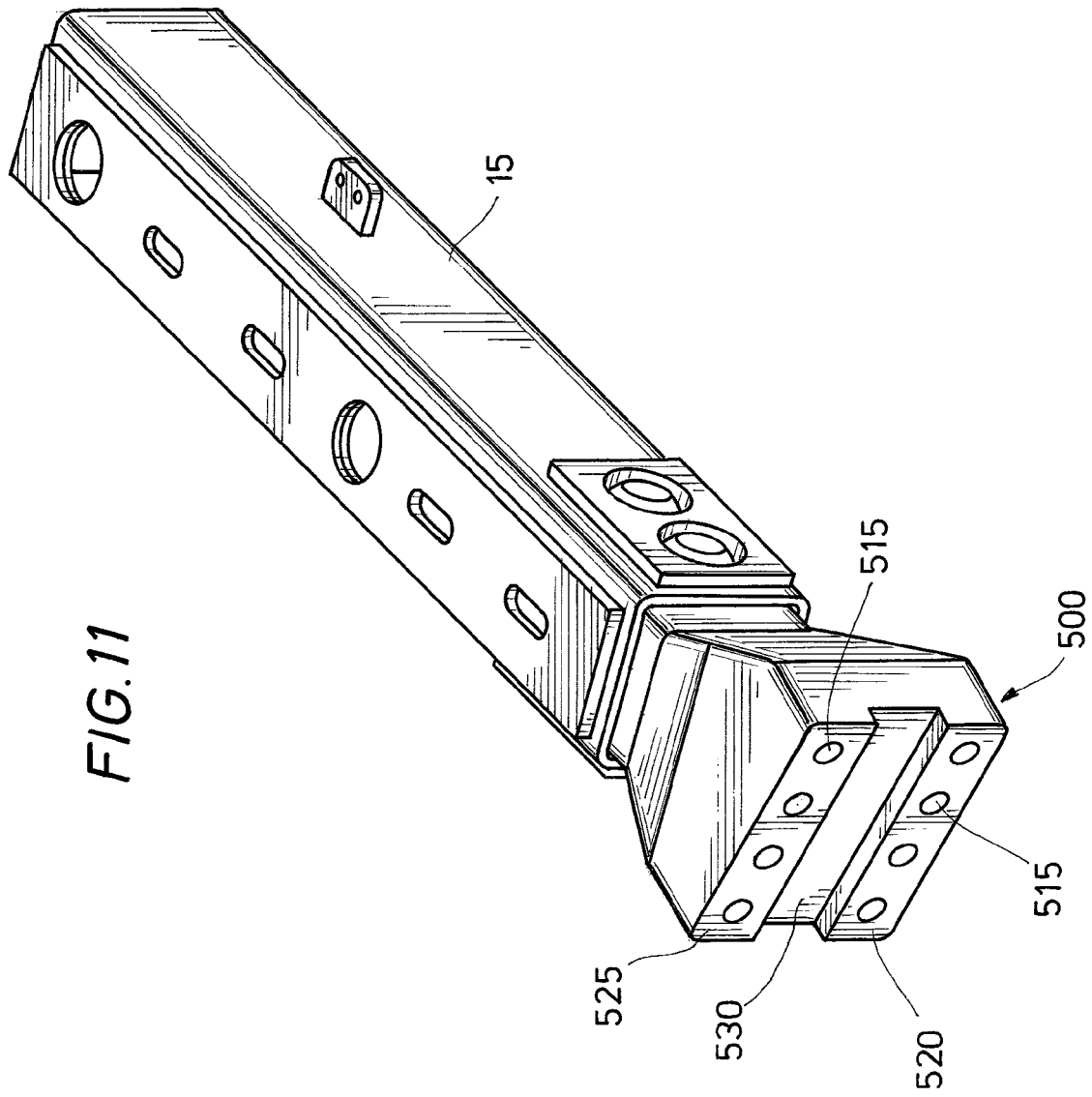
FIG. 11 illustrates a side perspective view of an embodiment of a tow bar with an attachment surface.

FIGS. 9, 10, and 11 illustrate an embodiment of towing assembly 5 in which one of the tow bars 15 has attachment surface 500 on the end of tow bar 15 that is securable to lunette stop 170. It is to be understood that FIG. 10 shows towing assembly 5 with only one tow bar 15 for illustrative purposes only. Attachment surface 500 is secured to lunette stop 170 by securing means 145. In some embodiments, attachment surface 500 has a lower attachment surface 520 and an upper attachment surface 525. In embodiments, lower attachment surface 520 and upper attachment surface 525 are substantially in contact with lunette stop 170 when secured. In an embodiment, lower attachment surface 520 and upper attachment surface 525 are about parallel to each other. Without limitation, securing tow bar 15 to lunette stop 170 with securing means 145 may provide increased towing weight capacity. In some embodiments as shown, attachment surface 500 has attachment surface groove 530. Attachment surface groove 530 extends laterally across attachment surface 500 between lower attachment surface 520 and upper attachment surface 525.

In embodiments shown in FIG. 11, attachment surface 500 has securing means receptacles 515. In embodiments, attachment surface 500 has a plurality of securing means receptacles 515. Securing means receptacles 515 receive securing means 145 (i.e., a portion of a securing means 145 is disposed in a securing means receptacle 515). In embodiments in which securing means 145 comprise a screw, the screw screws into securing means receptacle 515. In embodiments as shown, lower attachment surface 520 and upper attachment surface 525 have securing means receptacles 515.

In FIG. 9, towing assembly 5 is shown with only tow bar 15 having attachment surface 500, with tow bar 15' being attached to lunette stop 170 with bar pin 25 and not by attachment surface 500. In other embodiments (not shown), both tow bars 15, 15' have attachment surface 500 and are attached to lunette stop 170 by attachment surface 500.

In an embodiment as shown in FIG. 9, towing assembly 5 has handles 510. In embodiments, handles 510 have a curved shape, which, without limitation, facilitates an operator to handle towing assembly 5 (i.e., to move laterally, pick-up, and the like). In embodiments, towing assembly 5 has a handle 510 on a top surface of lunette stop 170. In some embodiments, towing assembly 5 has a handle on a tow bar 15 and/or a tow leg 20. In embodiments, towing assembly 5 has a handle 510 on a side surface of a tow leg 20 side opposing the other tow leg 20.

Figure 12:
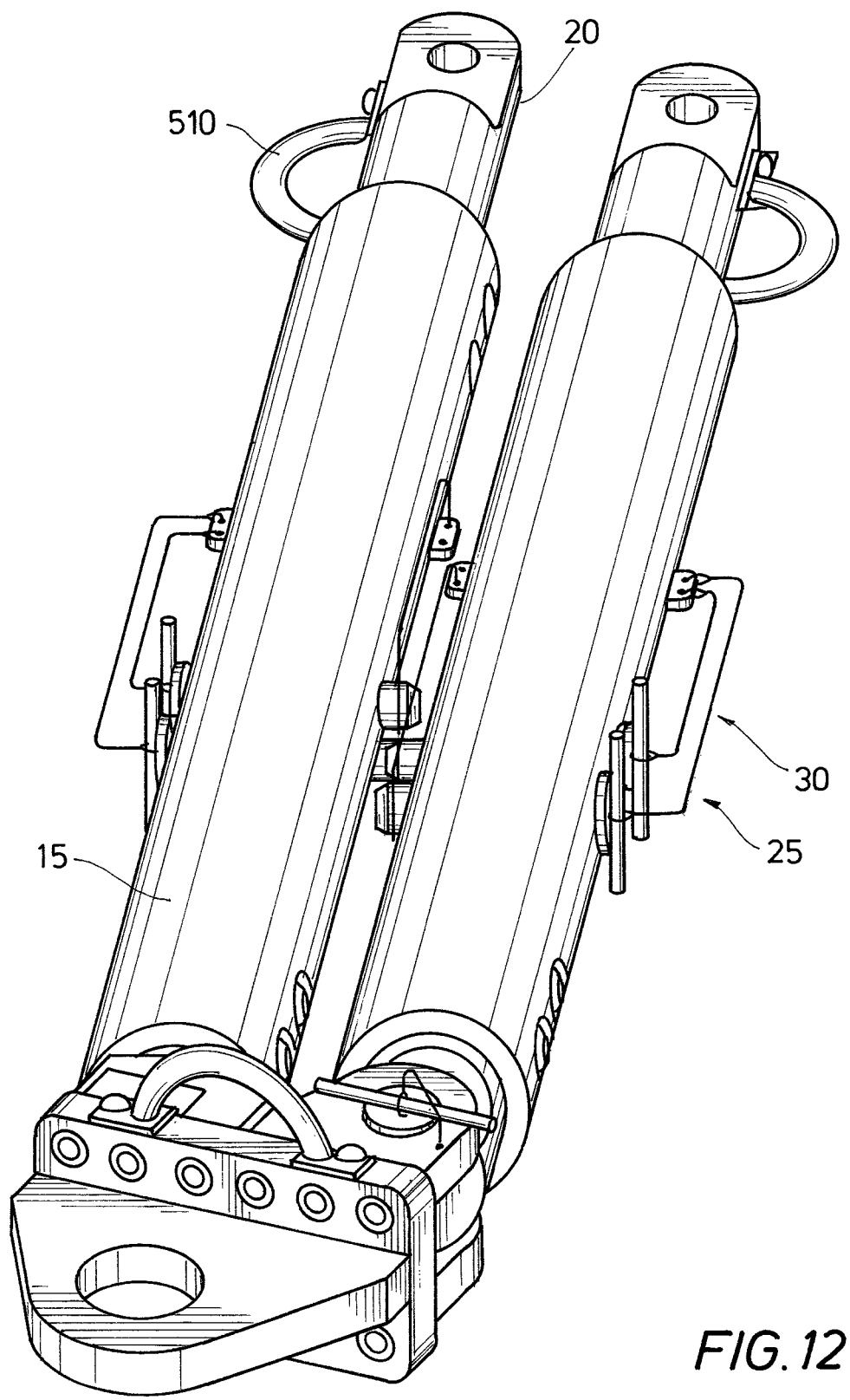
FIG. 12 illustrates a top perspective view of an embodiment of a towing assembly.

Tow bar 15 and tow legs 20 may have any suitable configuration for a towing assembly 5. In an embodiment as shown in FIG. 1, tow bars 15 and tow legs 20 have a rectangular configuration. In an embodiment as shown in FIG. 12, tow bars 15 and tow legs 20 have a cylindrical configuration. In embodiments as shown in FIG. 12, tow bar 15 has two bar pins 25 disposed on a side of tow bar 15. In alternative embodiments (not shown), tow bar 15 has more than tow bar pins 25.

Although the present invention and its advantages have been described in detail, it should be understood that various changes, substitutions and alterations may be made herein without departing from the spirit and scope of the invention as defined by the appended claims.

What is claimed is:

1. A towing assembly for towing a vehicle with a towing vehicle, comprising:
   a lunette, wherein the lunette attaches the towing assembly to the towing vehicle;
   tow bars, wherein the tow bars are attached to the lunette, and wherein at least one of the tow bars is laterally moveable;
   tow legs, wherein each tow leg is slidably engaged with an interior of a tow bar, and wherein the tow leg is attachable to the vehicle;
   wherein each tow bar comprises a stowage position;
   wherein the stowage position comprises a stowage position opening; and
   wherein each tow leg comprises a tow leg attachment opening, and wherein the tow leg is slidably engaged with the interior of the tow bar to dispose the tow leg at a position in the interior to allow a bar pin to be disposed through the stowage position opening and the tow leg attachment opening.

2. The towing assembly of claim 1, wherein the lunette comprises a lunette opening.

3. The towing assembly of claim 1, wherein the lunette comprises a hitch upper platform and a hitch lower platform.

4. A towing assembly for towing a vehicle with a towing vehicle, comprising:
   a lunette, wherein the lunette attaches the towing assembly to the towing vehicle;
   tow bars, wherein the tow bars are attached to the lunette, and wherein at least one of the tow bars is laterally moveable;
   tow legs, wherein each tow leg is slidably engaged with an interior of a tow bar, and wherein the tow leg is attachable to the vehicle;
   wherein each tow bar comprises a towing position;
   wherein the towing position comprises a towing position opening; and
   wherein each tow leg comprises a tow leg attachment opening, and wherein the tow leg is slidably engaged with the interior of the tow bar to dispose the tow leg at a position in the interior to allow a bar pin to be disposed through the towing position opening and the tow leg attachment opening.

5. The towing assembly of claim 4, wherein the lunette comprises a lunette opening.

6. The towing assembly of claim 4, wherein the lunette comprises a hitch upper platform and a hitch lower platform.

7. The towing assembly of claim 4, wherein each tow bar comprises a stowage position.

\* \* \* \* \*